Dec. 14, 1943.                E. LEWIS ET AL                    2,336,487
                         STONE QUARRYING APPARATUS
                        Filed Jan. 19, 1942          2 Sheets-Sheet 1

INVENTORS
EDWARD LEWIS and
BY HENRY A. MICHELBRINK
Bates, Teare, & McBean
ATTORNEYS

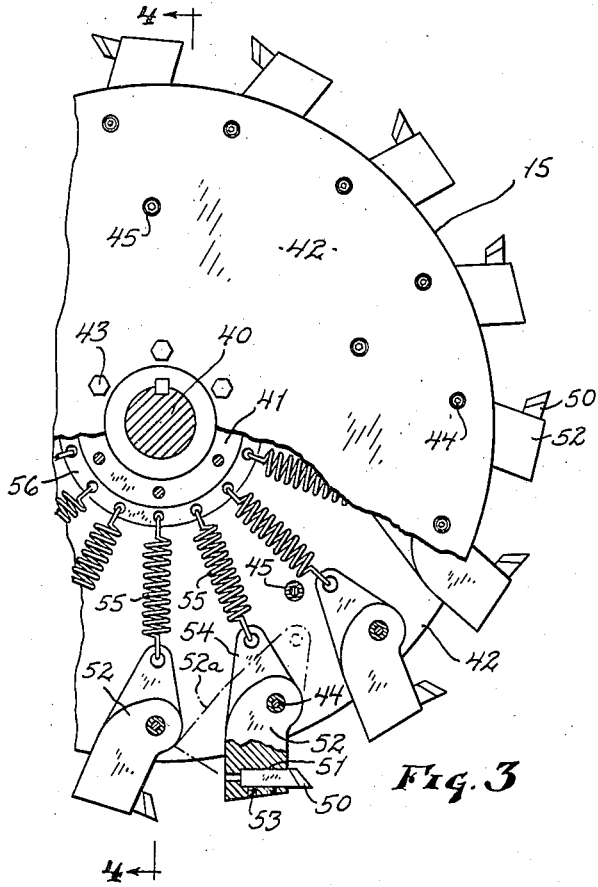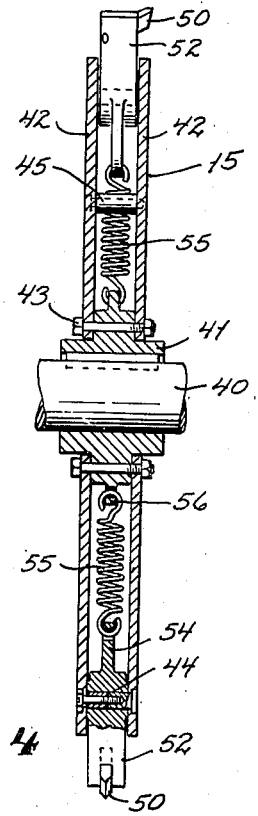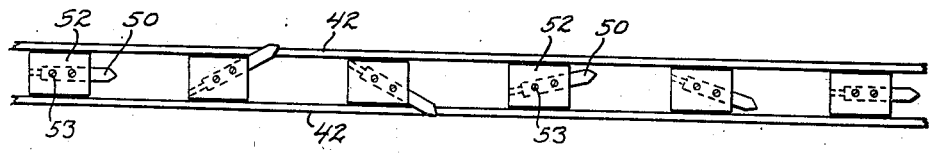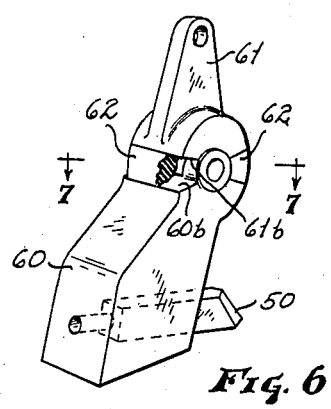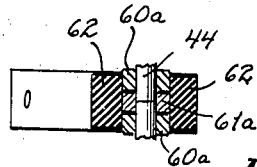

Patented Dec. 14, 1943

2,336,487

UNITED STATES PATENT OFFICE 2,336,487

STONE QUARRYING APPARATUS

Edward Lewis, Cleveland, and Henry A. Michelbrink, Euclid, Ohio

Application January 19, 1942, Serial No. 427,280

11 Claims. (Cl. 262—20)

This invention relates to a stone-quarrying apparatus and more particularly to a machine for cutting a bed of stone into blocks as the machine travels with relation to the bed.

We are not aware of any power machine which has heretofore been used to cut a native bed of stones into blocks. The methods which have been used for separating stone in a quarry have been directed towards producing cracks through the structure of the stone, such as by drilling a series of holes and then by means of powder charges or by wedges, causing a crack or split to form along the series. Such methods require a great deal of time and manual labor.

It is an object of this invention to provide a machine which will form separate blocks in a stone-bed, within a minimum of time and which will eliminate all manual labor except the manipulation of the controls by the operator. A further object is to provide such a machine which will be simple in operation and capable of use by a comparatively unskilled operator, our machine being of comparatively inexpensive nature and at the same time rugged and dependable in operation.

Our machine provides a tractor carrying a cutting wheel and a feature of our invention is the construction of the cutting wheel, whereby it may be very narrow in width, as desirable to avoid wastage of stone, without the sacrifice of stability and ruggedness. Another feature is concerned with yielding supports for the cutting knives, protecting them if abnormally hard strata is encountered, and producing a highly desirable flailing or chopping action upon the stone as distinguished from a planing or scraping action.

Other objects and features will become apparent from the specification and the related drawings, and will be summarized in the appended claims.

Figure 1:
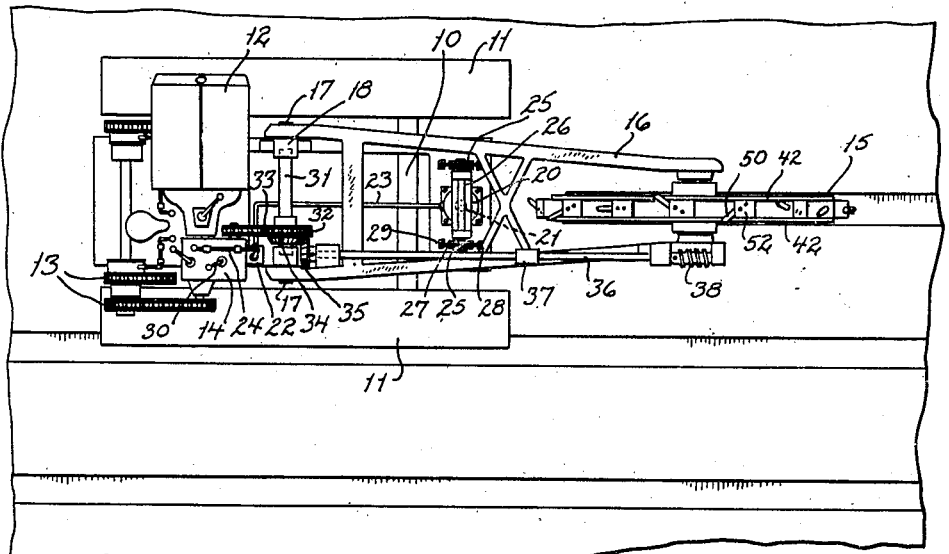
Figure 2:
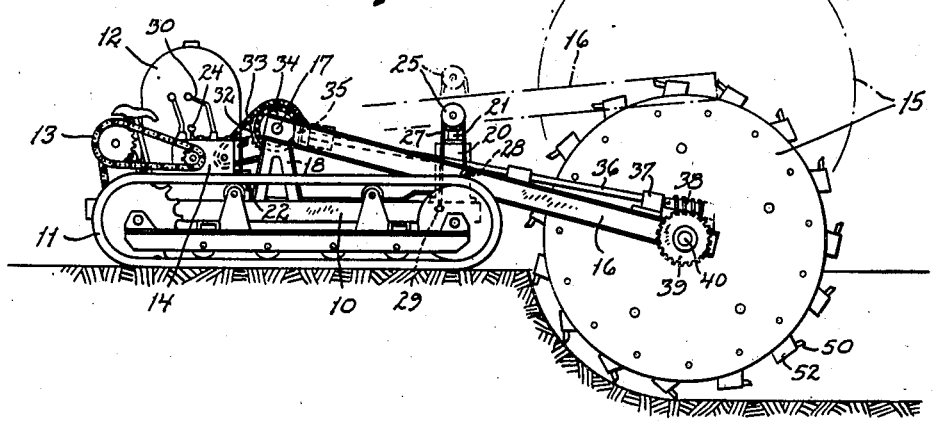
Figure 8:
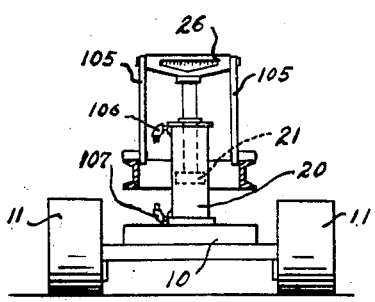

In the drawings, Fig. 1 is a top plan view of the quarrying machine of our invention, the machine being illustrated in the act of cutting a series of kerfs in a bed of stone; Fig. 2 is a side elevation of the machine; Fig. 3 is a fragmentary side elevation of the cutting wheel per se, partly broken away to better illustrate the mounting of the cutting teeth; Fig. 4 is a transverse cross section of the cutting wheel, taken on the plane indicated by the line 4—4 in Fig. 3; Fig. 5 is in the nature of a diagram, being a development of the outer periphery of the cutting wheel to illustrate the arrangement of the cutting teeth; Fig. 6 is a perspective view of a modified form of cutting tooth carrier; Fig. 7 is a transverse cross section on the line 7—7 of Fig. 6; and Fig. 8 is a vertical section taken through Fig. 2 and illustrating a modification of the power means utilized for raising and lowering.

The quarrying machine of our invention comprises a vehicle, preferably of the endless-tread type, carrying a cutting wheel and means for adjustably moving the cutting wheel toward and from a stone surface and means for revolving the wheel. In the embodiment illustrated and best seen in Figs. 1 and 2, the chassis 10 of the vehicle is mounted upon the endless-treads 11. The treads may be driven by a motor 12 by any well known transmission mechanism, as for instance a chain and sprocket system 13 and gear-box 14.

The cutting wheel, illustrated in general at 15, is carried at the end of a boom 16, pivoted for up and down movement on studs 17 secured in brackets 18 mounted on the chassis. To present the cutting wheel to the stone and to regulate the depth of the cut, means are provided to raise or lower the boom, as desired. We have illustrated such means in the form of a hydraulic cylinder 20 and piston 21.

As shown in Figs. 1 and 2, the cylinder 20 is mounted vertically upon the chassis and is supplied with oil under pressure by means of an oil pump 22 and oil line 23, the supply being controlled by the operator by means of the valve handle 24. At the upper end of the piston-rod, a pair of sheaves 25 are mounted at either end of a cross-head 26. Cables 27 are secured at either side of the boom, as at 28, and pass over the sheaves and down to a fixed anchorage as at 29 on the chassis. Thus, when oil is pumped into the cylinder the piston is raised and the cables 27 pull the boom upwardly to an elevated position, such as that shown in broken lines in Fig. 2, in which position, the cutting wheel is clear of the surface and the machine is ready for road travel. The wheel may be lowered any desired amount during operation by allowing the necessary amount of oil to escape from the cylinder under control of the handle 24.

The rotation of the cutting wheel is derived from the motor 12 and gear-box 14 under control of the shift-lever 30 and a clutch pedal not shown. A cross shaft 31 is rotatably mounted in the brackets 18 coaxial with the bearing studs 17 and carries a sprocket wheel 32 which is driven by a chain 33 from the gear box. Drivingly secured to the sprocket wheel is a bevel gear 34 meshing with a second bevel gear 35. The latter is secured on a shaft 36, which runs the length of the boom and is carried in bearings 37 thereon. Secured to the outer end of the shaft 36 is a worm 38 which meshes with a worm gear 39 drivingly secured on the cutting wheel shaft 40. As illustrated in Figs. 3 and 4, the hub 41 of the cutting wheel is keyed to this shaft and therefore, through the drive system just described, derives power from the motor.

The cutting wheel comprises mainly a hub and a pair of discs secured thereto, which serve as supports for a series of resiliently mounted cutting teeth. As best seen in Figs. 3 and 4, the discs 42 are axially spaced and secured to the hub 41 as by series of bolts 43. Near their peripheries the discs are secured by spacing pins 44, which also serve as pivots for the cutting tooth holders, and intermediately by spacers 45.

As previously mentioned, the holders for the cutting teeth are resiliently mounted upon the wheel, such resiliency being highly desirable in the cutting action of the machine and for the protection of the cutting teeth when encountering occasional veins or strata of greater hardness or imbedded foreign material.

The cutters 50 are carried in sockets 51 in the holders 52 and secured in place by set screws 53. The holders are solid blocks which are pivoted on the pins 44 previously mentioned. In the form shown in Figs. 3 and 4, these blocks are provided with inwardly directed ears 54. Relatively stiff tension springs 55 are anchored to an annular rib 56 on the hub 41 and at their outer ends are secured to the ears 54.

The springs 55 tend to keep the holders and the teeth in the normal idle position shown in full lines in Fig. 3, wherein the cutting end of the teeth lie in the radial planes passing through the axes of the pivot pins 44. While cutting a kerf, however, a tooth strikes the stone, chipping a fragment therefrom and rebounds. Thereafter, the spring 55 causes it to strike again upon the stone to chip the next fragment and allows the tooth again to rebound. A flailing action is thus produced which is highly efficient in the removal of the stone. Upon meeting an obstacle in their path, the teeth will be forced back still further, excessive movement of this sort being prevented by a fixed stop which may be the next following block 52, as illustrated in broken line 52—a in Fig. 3.

The individual teeth are staggered in respect to each other so that although their widths are but a fraction of the total width of the cut, their effect will be additive and a sufficiently wide kerf will be made to allow clearance for the body of the wheel.

In the preferred embodiment shown, as will be seen from Fig. 5, there are five locations of the cutting teeth in a group of holders, this arrangement or pattern occuring three times among the total of fifteen. As there shown, the cutting tooth at the left end of the figure is centrally located. The next one is directed to the extreme left, the next one to the extreme right, the next one to an intermediate left hand position, the next one to an intermediate right hand position, while the last one is directed centrally to start a repetition of the pattern. It will be noted that the extreme left and right hand tools extend beyond the limit of the side discs illustrated at 42 and, therefore, the kerf which is cut is wider than the wheel. It will also be noted that there is some degree of overlapping between the various tools and that thereby a complete cut is made.

In Figs. 6 and 7, we have illustrated a modified form of cutting tooth holder, which may be utilized in the machine to absorb vibrations and to prevent small shocks from being transmitted to the wheel. In this form, the tool holder comprises two parts 60 and 61, both pivoted on the cross-pins 44 of the wheel with rubber blocks 62 between radially extending shoulders on the two parts. Motion of the part 60 is transmitted to the part 61 through the rubber block, thus giving the yielding action desired.

As best seen in Fig. 7, the lower part 60 which carries the cutting tool 50 is provided with two upstanding ears 60a which embrace the pin. The part 61 which carries the ear for the spring 55 is provided with a single depending ear 61a which lies between the two ears 60a and also embraces the pin. The segment-shaped rubber blocks 62 occupy the spaces at either side of the pivot between shoulders 60b and 61b on the parts 60 and 61 respectively, and may be secured thereto as by cementing or vulcanizing.

It will be apparent that, should a force in addition to gravity be desired in presenting the cutting wheel to the stone, rigid links between the boom 16 and the crosshead 26 could be substituted for the cables 27 of the present embodiment and a double-acting cylinder could be employed to thereby force the boom downwardly as well as to raise it.

Such cylinder is illustrated in Fig. 8 wherein the rigid links are shown at 105 as extending between the boom 16 and the cross head 26. Suitable piping connections to the cylinder for supplying fluid thereto are indicated at 106 and 107, respectively.

We claim:

1. In a stone-quarrying apparatus, the combination of a wheel, means for rotating the wheel and cutting knives yieldingly carried about the periphery of the wheel and projecting forwardly and laterally beyond the sides thereof to engage the stone to be cut.

2. In a stone-quarrying apparatus, the combination of a tractor, a wheel carried thereby, means for rotating the wheel and cutting knives yieldingly carried about the periphery of the wheel and adapted to engage the stone to be cut.

3. In a stone-quarrying apparatus, the combination of a wheel adapted to be propelled bodily and rotated, a set of knife carriers pivoted to the wheel adjacent its periphery, knives on the knife carriers, some of which project beyond the sides of the wheel, and means for yieldingly holding said knife carriers.

4. In a stone-quarrying apparatus, the combination of a tractor, a rotatable wheel carried thereby, a set of knife carriers pivotally mounted on the wheel, knives on the knife carriers adapted on the underside of the wheel to engage and cut a kerf in a bed of stone on which the tractor may travel, springs yieldingly acting on the knife carriers, and means for the limiting movement of the knife carriers on their pivots.

5. In a stone-quarrying apparatus, the combination of a bodily movable and rotatable wheel, series of knife carriers pivotally mounted thereon projecting therefrom, springs acting on the knife carriers to yieldingly resist their movement on their pivots during operation, knives mounted on the knife carriers in staggered relation in different carriers.

6. A combination of a tractor, a wheel carried thereby, operating mechanism on the tractor, a connection therefrom to the wheel whereby the wheel may be rotated, knife carriers pivotally mounted on the wheel, knives on the different carriers projecting in several directions, springs tending to hold the knife carriers in normal position but allowing them to swing back during operation, there being means for limiting the backward movement of the knife carriers.

7. In a stone-cutting apparatus, the combination of a rotatable and bodily movable wheel, a series of knife carriers pivoted thereto, adjacent the periphery of the wheel, springs acting on the carriers tending to hold them yieldingly in normal positions, abutments limiting the ultimate movements of the carriers, and knives mounted on the carriers and arranged differently on successive carriers so that some extend in the plane of rotation, some project to one side thereof, and some project to the other side thereof.

8. In a stone-quarrying apparatus, the combination of a tractor, a boom extending rearwardly therefrom and pivotally attached to the tractor at its forward end, a wheel rotatably carried by the boom at its rearward end, means for propelling the tractor, means for adjusting the boom up and down, a series of cutting knives yieldingly carried by the cutting wheel and adapted to cut a kerf in the stone bed on which the tractor travels.

9. The combination of a tractor, a boom extending therefrom, a rotatable wheel on the boom, means for moving the tractor, means for rotating the wheel, means for adjusting the boom up and down, a series of knife carriers pivotally mounted about the periphery of the wheel, said carriers being yieldable to swing backwardly on their pivots, springs for opposing such swinging, and knives projecting from the carriers, some diagonally to one side, some to the other side, and some straight ahead.

10. In a machine for quarrying stone, the combination of a rotatable wheel having a hub and a pair of parallel discs extending therefrom, knife carriers pivotally mounted between the two discs, said carriers having inward extensions, tension springs anchored at one end to the hub, at the other end to the inward extensions, and knives carried by the knife carriers.

11. In a stone-quarrying machine, the combination of a rotatable wheel, a series of knife carriers pivotally mounted on the wheel adjacent its periphery, inwardly extending levers mounted on the knife carrier pivots and associated one with each knife carrier, the knife carrier and its lever having shoulders spaced apart, and blocks of yielding material located in such space to hold the knife carriers yieldingly, and knives carried by the knife carriers.

EDWARD LEWIS.
HENRY A. MICHELBRINK.